United States Patent
Song et al.

(10) Patent No.: US 11,167,645 B2
(45) Date of Patent: Nov. 9, 2021

(54) METHOD FOR INSPECTING TRACTION POWER NETWORKS

(71) Applicant: Nanjing Institute of Railway Technology, Nanjing (CN)

(72) Inventors: Qihou Song, Changzhou (CN); Honggao Feng, Changzhou (CN); Baichuan Xu, Changzhou (CN)

(73) Assignee: Nanjing Institute of Railway Technology, Nanjing (CN)

( * ) Notice: Subject to any disclaimer, the term of this patent is extended or adjusted under 35 U.S.C. 154(b) by 165 days.

(21) Appl. No.: 16/706,811

(22) Filed: Dec. 8, 2019

(65) Prior Publication Data

US 2020/0398672 A1    Dec. 24, 2020

(30) Foreign Application Priority Data

Jun. 20, 2019 (CN) .......................... 201910536064.6

(51) Int. Cl.
*B60L 9/00* (2019.01)
*B60L 3/00* (2019.01)
*B60L 3/06* (2006.01)

(52) U.S. Cl.
CPC .......... *B60L 3/0084* (2013.01); *B60L 3/0038* (2013.01); *B60L 3/0092* (2013.01); *B60L 3/06* (2013.01); *B60L 2260/56* (2013.01)

(58) Field of Classification Search
USPC ........................................................ 701/22
See application file for complete search history.

(56) References Cited

U.S. PATENT DOCUMENTS

| | | | |
|---|---|---|---|
| 2007/0208520 A1* | 9/2007 | Zhang .................... | H02H 3/335 702/58 |
| 2008/0091308 A1* | 4/2008 | Henson ................ | H02H 1/0015 700/293 |
| 2019/0041845 A1* | 2/2019 | Cella ..................... | G05B 23/024 |
| 2019/0250069 A1* | 8/2019 | Samadani ............. | B61L 25/021 |
| 2019/0359239 A1* | 11/2019 | Subrahmaniyan .... | B61L 25/025 |

\* cited by examiner

*Primary Examiner* — Shardul D Patel
(74) *Attorney, Agent, or Firm* — Idea Intellectual Limited; Margaret A. Burke; Sam T. Yip (57) ABSTRACT

A method for inspecting a traction power network is provided based on a platform which includes a device body of an inspection device for a traction power network apparatus. A power switch is disposed on an outer surface of the device body near a front end thereof, in which a sensitive galvanometer is disposed on the power switch. One end of the sensitive galvanometer is fixedly connected to a temperature sensor coupled to a controller. The controller is coupled to a 4G first communication module coupled to a 4G network. The 4G network is coupled to a processing platform coupled to the 4G network through a 4G second communication module. Other methods and structures are combined to avoid deficiencies in the prior art, such as poor speed and long time in the temperature signal transmission and avoid a controller without meeting requirements for efficient and timely temperature signal transmission.

13 Claims, 1 Drawing Sheet

METHOD FOR INSPECTING TRACTION POWER NETWORKS

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application claims priority from the China patent application number 201910536064.6 filed Jun. 20, 2019; the disclosure of which is incorporated herein by reference in its entirety.

FIELD OF THE INVENTION

The present invention generally relates to the field of techniques inspecting traction power. More specifically, the present invention relates to methods for inspecting traction power networks.

BACKGROUND OF THE INVENTION

Traction power equipment is an entire power supply system that transmits electric power to electric locomotives and D-series high-speed train running on electrified railways, which can go through steps of high-voltage power transmission, traction substation voltage reduction, phase transformation or commutation, and so on by a power system.

To inspect a traction power equipment, inspection devices are widely applied in the traction power equipment. An inspection device is an industrial measurement and control meter, which can be collectively used with various sensors and transmitters. The inspection device can be configured to perform inspection with respect to multi-channel temperature, pressure, liquid level, flow, weight, current, voltage, and other industrial process parameters and perform alarm control, transformation output, data collection, and communication.

The inspection device of the traction power equipment can be conveniently used at night through a fluorescent sleeve disposed thereon, which improves convenience. An outer surface of the fluorescent sleeve is coated with fluorescent agent, which can absorb incident light at night to produce fluorescence, so as to make the doped substance obtain glittering effect similar to fluorspar, to make the substance seen by human eyes as shining-white, and to achieve finding the fluorescent sleeve easily at night. By a sensitive galvanometer disposed therein, a tiny current difference inside the inspection device can be inspected, which improves the sensitivity of inspection. A pointer of the sensitive galvanometer is a reflected light spot, which means no bearing is used and thus eliminates inevitable mechanical friction, thereby increasing the sensitivity correspondingly. By disposing a transparent endurance board therein, a display screen is prevented from being broken, thereby improving the service life thereof. The endurance board is made of a high-performance industrial plastic that is processed by using polycarbonate or polycarbonate, which results in advantages of crashworthiness and strong hardness. The whole device achieves simple structure, convenient operation, and better performance than that of a conventional approach.

In practice, in order to save resources of a processing platform, there is typically only one processing platform but with several controllers required to transmit temperature signals. Each controller must upload the temperature signal to the processing platform. At present, a transmission mode for the temperature signal is a sequential transmission mode. That is, only when a controller completes transmitting a temperature signal, a subsequent controller is allowed to transmit a temperature signal. If a time duration of a temperature signal transmitted by a controller is not small, other controllers subsequent to that controller will just be on the queue, which results in an unsatisfactory temperature signal transmission speed, relatively long transmission time, and failure to meet requirements for a controller with efficient and timely temperature signal transmission.

SUMMARY OF THE INVENTION

The purpose of this section is to outline some aspects of embodiments of the present invention and briefly introduce some preferred embodiments. Some simplification or omission may be made in this section, the abstract, and the invention title of the present application, so as to avoid confusion to the purpose of this section, the abstract, and the invention title, and such simplification or omission cannot be used to limit the scope of the present invention.

In view of the existing problems in the prior art, the present invention is provided.

Accordingly, one of the objectives of the present invention is to provide a method for inspecting traction power networks, which effectively overcome the deficiencies in the prior art, such as low temperature signal transmission speed, long temperature signal transmission time, and failure to meet requirements for a controller with efficient and timely temperature signal transmission.

Advantages of the present invention are provided as follows. A process of the present invention operable in an intermediate router can efficiently achieve temperature signal transmission, thereby overcoming the deficiency in the exisiting temperature signal transmission mode which is a sequential transmission mode. That is, only when a controller completes transmitting a temperature signal, a subsequent controller is allowed to transmit a temperature signal. If a time interval of a temperature signal transmitted by a controller is not small, other controllers subsequent to the controller will just be on the queue, which results in an unsatisfactory temperature signal transmission speed, long temperature signal transmission time, and failure to meet requirements for a controller with an efficient and timely temperature signal transmission. Furthermore, since the temperature signals are clustered, demand for temperature signal transmission is lower.

BRIEF DESCRIPTION OF THE DRAWINGS

In order to explain technical solutions of embodiments of the present invention more clearly, the following is a brief introduction to a FIGURE used in description of embodiments provided hereinafter; what the below FIGURE shows merely some embodiments of the present invention; and it is possible for a person skilled in the art, without any inventive effort, to further create other figures according to the FIGURE below, in which.

DETAILED DESCRIPTION

The above described objectives, features and advantages of the present invention will become more apparent from the detailed description.

Figure 1:
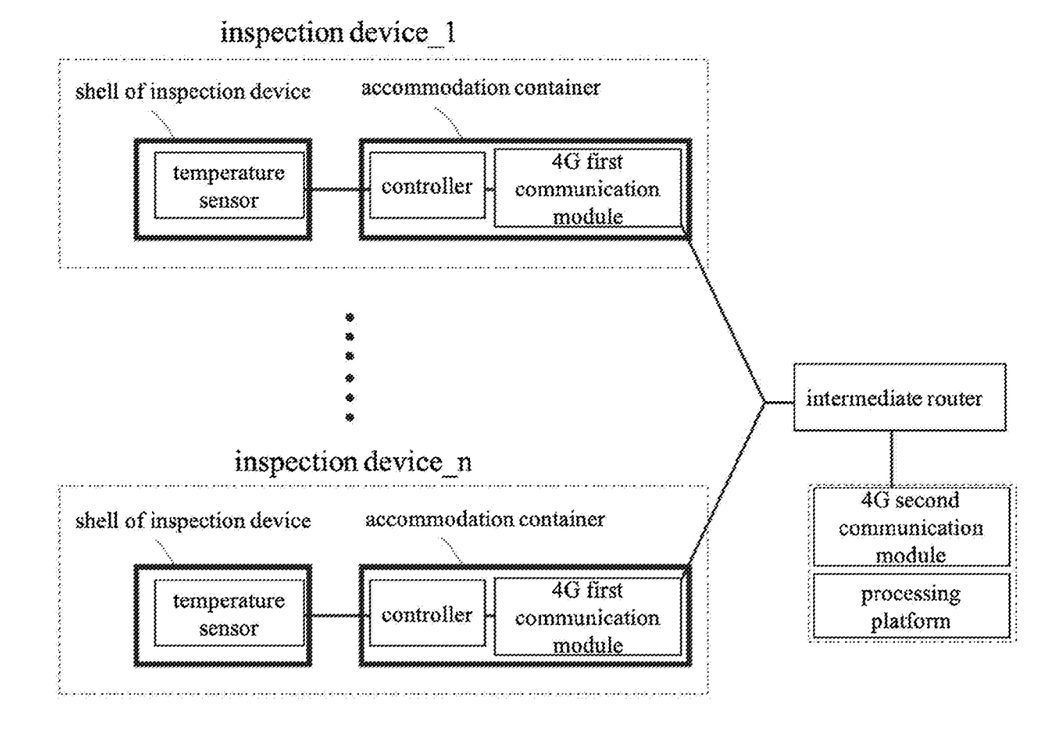
FIG. 1 is a structural diagram of a platform for inspecting a traction power network of the present invention.

Referring to FIG. 1 which illustrates an embodiment of the present invention, the embodiment provides a platform for inspecting a traction power network. The platform includes a main body of an inspection device for a traction power network apparatus. A shell is fixedly assembled to an outer surface of the device body, and a control panel is fixedly assembled to a front end of the shell. A display screen is fixedly assembled to a middle of the control panel, and an input port is disposed at a lower end of the control panel. A power switch is disposed on a side of the outer surface of the device body near a front end thereof, in which a sensitive galvanometer is disposed on a side of the power switch. One end of the sensitive galvanometer is fixedly connected to a temperature sensor, and a thermocouple wire is fixedly assembled to an interior of the temperature sensor.

The temperature sensor is coupled to a controller. The controller is coupled to a 4G first communication module. The 4G first communication module is coupled to a 4G network. The 4G network is coupled to a processing platform. The controller can be a single chip computer, a programmable logic controller (PLC), an advanced RISC machine (ARM) processor, or a field-programmable gate array (FPGA) processor. The processing platform can be a personal computer (PC) or a personal digital assistant (PDA). The processing platform is coupled to the 4G network through a 4G second communication module. A link from the controller to an intermediate router of the 4G network is established through the 4G first communication module. A link from the processing platform to the intermediate router of the 4G network is established through the 4G second communication module. Further, an outer wall of the shell of the inspection device is screwed to connect to an accommodation container with a hollow space and in a cuboid shape, and the controller and the 4G first communication module are disposed in the interior of the accommodation container. The outer wall of the accommodation container is provided with at least one wire slot capable of being penetrated by a wire for connection between the temperature sensor and the controller. The outer wall of the accommodation container is further provided with at least one heat dissipation hole capable of being penetrated for heat dissipation from the interior of the accommodation containers.

The number of processing platforms is one, and the numbers of temperature sensors and the controllers coupled thereto are several, respectively. Each controller can establish a link with the processing platform through the intermediate router. A temperature signal collected by each of the temperature sensors can be transmitted to the corresponding controller, and then each of the controllers can transmit the temperature signal to the processing platform through the intermediate router.

In accordance with the platform for inspecting the traction power network above, the present invention further provides a method for inspecting the traction power network, which includes the following steps:

Step 1: a temperature sensor of each inspection device is coupled to a corresponding controller, and a link between each of the controllers and a processing platform is established through an intermediate router. A temperature signal collected by each of the temperature sensors is transmitted to the corresponding controller, and then the controller transmits the temperature signal to a remote processing platform for processing. The processing approach can be by displaying on a display screen of the processing platform for the corresponding monitoring personnel to examine, thereby realizing the purpose of transmitting the temperature signal from the controller to the remote processing platform for processing.

Step 2: an approach for transmitting the temperature signal from each of the controllers to the processing platform includes a process implemented in the intermediate router. The phrase "a process implemented in the intermediate router" includes three embodiments as follows:

A first embodiment: a process implemented in the intermediate router includes the following steps executed in sequence:

A-1: obtaining the temperature signals to be transmitted to the processing platform which are transmitted by the several controllers.

In step A-1, prior to obtaining the temperature signals to be transmitted to the processing platform which are transmitted by the several controllers, the method further includes: testing whether the link of each of the controllers is unblocked. When the link is tested as unblocked, the temperature signal to be transmitted to the processing platform which is transmitted by each the controller is received. When the link is tested as blocked, the receiving of the temperature signal to be transmitted to the processing platform which is transmitted by each the controller is terminated until the link is tested as unblocked, and then the receiving of the temperature signal to be transmitted to the processing platform which is transmitted by each of the controllers is executed.

After the receiving of the temperature signal to be transmitted to the processing platform which is transmitted by each the controller, step A-1 may further include: according to a preset temperature signal requirement, determining whether the temperature signal to be transmitted to the processing platform which is transmitted by each the controller meets a signal transmission protocol. If the temperature signal to be transmitted to the processing platform which is transmitted by each the controller is determined as meeting the signal transmission protocol, it will be brought to step A-2 for subsequent execution. If the temperature signal to be transmitted to the processing platform which is transmitted by each the controller is determined as not meeting the signal transmission protocol, an instruction of re-transmitting the temperature signal will be transmitted to the controller that is determined as not meeting the signal transmission protocol, and the temperature signal re-transmitted by the controller that is determined as not meeting the signal transmission protocol would be received. The signal transmission protocol can be preset as signal format of a transmission temperature signal protocoled between the controller and the intermediate router.

A-2: determining individually whether there is no fault in the temperature signal to be transmitted to the processing platform by each of the controllers.

In particular, the determination of whether there is no fault in the temperature signal to be transmitted to the processing platform by each the controller can be made according to some specific parameters, such as whether the temperature signal to be transmitted to the processing platform is not NULL, and/or whether the temperature signal meets the requirements of capacity size and format.

In step A-2, the determination of whether there is no fault in the temperature signal to be transmitted to the processing platform by each the controller is by determining individually whether there is no fault in the temperature signal to be transmitted to the processing platform by each of the controllers. For example, in the case where a first temperature signal transmitted by a first controller and a second temperature signal transmitted by a second controller have been received, the determination of whether there is no fault in the temperature signal to be transmitted to the processing platform is by determining whether there is no fault in the first temperature signal transmitted by the first controller, and whether there is no fault in the second temperature signal transmitted by the second controller, respectively.

A-3: obtaining a signal identification code from the temperature signal to be transmitted to the processing platform by each of the controllers which has been confirmed that no fault is found in the temperature signal.

In particular, the signal identification code in the temperature signal to be transmitted to the processing platform may be a mark preset for a signal. For example, a signal identification code in a temperature signal to be transmitted to the processing platform by a first controller is set as signal 001, and a signal identification code in a temperature signal to be transmitted to the processing platform by a second controller is set as signal 010.

A-4: based on the obtained signal identification code of each the controller of the controllers which has been confirmed that no fault is found in the temperature signal, a first partitioning is performed on the temperature signal to be transmitted to the processing platform by each the controller of the controllers which has been confirmed as no fault is found in the temperature signal.

In step A-4, after the obtaining of the signal identification code of each the controller which has been confirmed as no fault is found in the temperature signal, each of the signal identification codes can be clustered, and the first partitioning is performed on the temperature signal to be transmitted to the processing platform by each the controller which has been confirmed that no fault is found in the temperature signal based on a clustering result. For example, taking controllers which have been confirmed that no fault is found in the temperature signals as a first controller, a second controller, a third controller, and a fourth controller, a signal identification code in a temperature signal to be transmitted to the processing platform by the first controller is signal 001; a signal identification code in a temperature signal to be transmitted to the processing platform by the second controller is signal 010; a signal identification code in a temperature signal to be transmitted to the processing platform by the third controller is signal 001; and a signal identification code in a temperature signal to be transmitted to the processing platform by the fourth controller is signal 010. The signal identification codes of these controllers are clustered, such that the signal 001 belongs to a first cluster and the signal 010 belongs to a second cluster. Based on such clustering result, the temperature signals to be transmitted to the processing platform by the first and third controllers are assigned to the first cluster, and the temperature signals to be transmitted to the processing platform by the second and fourth controllers are assigned to the second cluster.

A-5: determining capacity of transmitting temperature signal to the processing platform by each of the controllers which has been confirmed that no fault temperature signal is found.

In particular, after determining the capacity of transmitting the temperature signal to the processing platform by each of the controllers which has been confirmed that no fault is found in temperature signal, the capacity of each of the temperature signals is registered, and the temperature signal to be transmitted to the processing platform by each of the controllers which has been confirmed that no fault is found in temperature signal can be sequenced according to the capacity of the temperature signals, which facilitate the subsequent clustering of the temperature signals.

A-6: based on the determined capacity of transmitting the temperature signal to the processing platform by each of the controllers which has been confirmed that no fault is found in temperature signal, obtaining temperature signal capacity of each of the clusters after the first partitioning.

In step A-6, taking the above controllers which have been confirmed that no fault is found in temperature signal as the first controller, the second controller, the third controller, and the fourth controller, the capacity of the temperature signals to be transmitted to the processing platform by the first controller, the second controller, the third controller, and the fourth controller confirmed in step A-5 can be defined as: the capacity of transmitting the temperature signal to the processing platform by the first controller is 16*1024 bit; the capacity of transmitting the temperature signal to the processing platform by the second controller is 8*1024 bit; the capacity of transmitting the temperature signal to the processing platform by the third controller is 24*1024 bit; and the capacity of transmitting the temperature signal to the processing platform by the fourth controller is 20*1024 bit. If the first cluster of these controllers is the first cluster as illustrated in step A-4, the temperature signal capacity of such cluster is 40*1024 bit. The temperature signals to be transmitted to the processing platform by the second and fourth controllers are assigned to the second cluster, and temperature signal capacity of such cluster is 28*1024 bit.

A-7: based on the temperature signal capacity of each of the clusters after the first partitioning and a preset temperature signal transmission capacity, re-clustering the clustering result after the first partitioning.

In particular, a preset temperature signal transmission capacity can be determined based on some specific parameters. Taking a preset temperature signal transmission capacity of 36*1024 bit as an example, the temperature signals to be transmitted to the processing platform by the first and third controllers are assigned to a cluster having a capacity of 40*1024 bit. The temperature signals to be transmitted to the processing platform by the second and fourth controllers are assigned to a cluster having a capacity of 28*1024 bit. As such, the temperature signal capacity of a cluster of temperature signals transmitted to the processing platform by the first and third controllers is higher than 36*1024 bit. It is possible to vary the temperature signals transmitted to the processing platform by the third and fourth controller. That is, the temperature signals of the different clusters are varied respectively. The temperature signal to be transmitted to the processing platform by the first controller after variation and the temperature signal to be transmitted to the processing platform by the fourth controller after variation are assigned to a cluster which has a temperature signal capacity of 36*1024 bit. The temperature signals to be transmitted to the processing platform by the third and fourth controllers are accordingly assigned to a cluster which has a temperature signal capacity of 32*1024 bit. Hence, the temperature signal capacity of these clusters is not higher than 36*1024 bit, which meet the requirements, and thereby the variation is terminated.

A-8: based on the clustering result after the re-clustering, the temperature signal to be transmitted to the processing platform by each of the controllers which has been confirmed that no fault is found in temperature signal is packaged as an information package in accordance with the temperature signals of one cluster, and then all of the information packages are simultaneously transmitted to the remote processing platform.

In step A-8, based on the clustering result, the temperature signal to be transmitted to the processing platform by each controller can be transmitted to the remote processing platform at once, thereby improving the speed and performance of the temperature signal transmission. Prior to simultaneously transmitting all the information packages to the remote processing platform, step A-8 further includes testing whether the link between the intermediate router and the remote processing platform is unblocked. When the link is tested as unblocked, according to the clustering result of the temperature signal to be transmitted to the processing platform by each of the controllers which has been confirmed that no fault is found in temperature signal, all of the information packages are simultaneously transmitted to the remote processing platform. When the test of the link fails, meaning the link is blocked, the simultaneous transmission of all the information packages to the remote processing platform is terminated until the link is tested as unblocked such that all of the information packages can be simultaneously transmitted to the remote processing platform. The process implemented in the intermediate router can efficiently achieve the temperature signal transmission, thereby overcoming the deficiency in the existing temperature signal transmission mode which is a sequential transmission mode. That is, until a controller transmits a temperature signal, a subsequent controller is allowed to transmit a temperature signal. If a time duration of a temperature signal transmitted by a controller is not small, other controllers subsequent to that controller will just be on the queue, which results in an unsatisfactory temperature signal transmission speed, long temperature signal transmission time, and failure to meet requirements for a controller with an efficient and timely temperature signal transmission. Furthermore, since the temperature signals are clustered, requirements for the temperature signal transmission is lower, which can become more practical.

Further, the process implemented in the intermediate router may further include the following steps:

A-9: receiving a feedback message of the temperature signal transmission fed by the processing platform;

A-10: if the feedback message of the temperature signal transmission is that the temperature signal transmission is successful, transmitting a response message of the successful temperature signal transmission to each of the controllers which has been confirmed that no fault is found in temperature signal;

A-11: if the feedback message against the temperature signal transmission is that the temperature signal transmission fails, according to a preset period, the clustering result of the reclustering is executed, such that the temperature signal to be transmitted to the processing platform by each controller of the controllers which has been confirmed as no fault temperature signal is transmitted to the remote processing platform.

In particular, the intermediate router receives the feedback message of the temperature signal transmission fed by the processing platform; if the feedback message of the temperature signal transmission indicates that the temperature signal transmission is successful, the response message for indicating that the temperature signal transmission is successful is transmitted to each of the controllers which has been confirmed that no fault is found in temperature signal. If the feedback message of the temperature signal transmission indicates that the temperature signal transmission fails, according to a preset period, the clustering result of the reclustering is executed, such that the temperature signal to be transmitted to the processing platform by each the controller of the controllers which has been confirmed that no fault is found in temperature signal is transmitted to the remote processing platform, which can meet requirements in many cases. In step A-11, the preset period can be set as 6 or 8 seconds.

Further, step A-2 as afore-described (i.e. determining individually whether there is no fault in the temperature signal to be transmitted to the processing platform by each controller) can be alternatively implemented as follows:

A-2: determining individually whether there is any preset reserved word in the temperature signal to be transmitted to the processing platform by each the controller. Further, it is determined individually whether format of the temperature signal to be transmitted to the processing platform by each the controller meets requirements of preset format. In step A-2, setting the reserved word and the format can be realized based on the specific requirements, so as to verify whether there is any preset reserved word in the temperature signal to be transmitted to the processing platform by each the controller, and verify whether format of the temperature signal to be transmitted to the processing platform by each the controller meets the requirements of the preset format. For example, the preset reserved word can be set in the temperature signal updated by each the controller as including a recognition code and a stamp of the temperature signal. The requirements of the preset format include the transmitted temperature signal having the domain for storing the stamp of the temperature signal and another domain for storing identification. If it is determined that the temperature signal to be transmitted to the processing platform by each the controller has a preset reserved word and that the temperature signal to be transmitted to the processing platform by each the controller meets the requirements of the preset format, a process of obtaining the signal recognition code of the temperature signal to be transmitted to the processing platform by each the controller of controllers which has been confirmed as no fault temperature signal is performed. In step A-2, by the preset reserved word and the requirements of the preset format, the temperature signal to be transmitted to the processing platform by each controller can be verified whether to meet the requirements of the subsequent temperature signal transmission, and the subsequent temperature signal transmission can be executed after the verifying process, so as to ensure the accuracy of the subsequent temperature signal transmission, which can become more practical.

A second embodiment: the process implemented in the intermediate router includes the following steps executed in sequence:

B-1: verification instructions transmitted by several controllers are received, and the verification instructions contain identification codes of the controllers. In step B-1, the identification codes of the controllers can be determined by specific requirements and can be set as a unique identification code of each controller.

B-2: searching is performed to check whether any existence of the identification code of the verification instructions transmitted by the several controllers is in identification codes pre-stored in the controllers.

In particular, the identification code of the controller that can be allow to access is pre-stored, and the searching is performed to check whether any existence of the identification code of the verification instructions transmitted by the several controllers is in the pre-stored identification codes of the controllers.

B-3: if any existence of the identification codes of the several controllers is searched from the pre-stored identification code of the controller, a process of obtaining temperature signals to be transmitted to a processing platform that are transmitted by the several controllers would be executed.

In step B-3, if any existence of the identification codes of the controllers is searched from the pre-stored identification code of the controller, it would mean that that controller is a controller which is allowed to access. After the accessing is realized, the temperature signal to be transmitted to the processing platform that are transmitted by the controller is obtained.

B-4: if existence of the identification code of the controller to be accessed is not searched from the pre-stored identification code of the controller, the controller to be accessed would be forbidding accessing, and the message of unsuccessful verification would be transmitted to the controller to be accessed. The controller to be accessed is anyone of the controllers that transmit the verification instructions.

In particular, if existence of the identification code of the controller to be accessed is not searched from the pre-stored identification code of the controller, it would mean that the controller to be accessed is a controller forbidden accessing, and thus establishing a link from the controller to be accessed is forbidden.

In step B-4, by executing the verification in advance with respect to the verification instructions of each the controller, it can achieve that only those controllers agreed to access can establish links, so as to prevent safety problems resulted from accessing controllers that are not agreed to access, thereby ensuring the subsequent processes can be executed smoothly.

B-5: it is determined individually whether there is any fault in the temperature signal to be transmitted to the processing platform by each the controller.

In particular, the determining whether there is any fault in the temperature signal to be transmitted to the processing platform by each the controller can be set by specific requirements, such as determining whether the temperature signal to be transmitted to the processing platform is not NULL, and/or determining whether the temperature signal meets the constraints of capacity size and format.

In step B-5, the determining whether there is any fault in the temperature signal to be transmitted to the processing platform by each the controller is that the determining individually whether there is any fault in the temperature signal to be transmitted to the processing platform by each the controller. For example, in a case that a first temperature signal transmitted by a first controller and a second temperature signal transmitted by a second controller have been received, determining whether there is any fault in the temperature signal to be transmitted to the processing platform is that determining whether there is any fault in the first temperature signal transmitted by the first controller, and is further that determining whether there is any fault in the second temperature signal transmitted by the second controller.

B-6: a signal identification code is obtained from the temperature signal to be transmitted to the processing platform by each the controller of the controllers which has been confirmed as no fault in the temperature signal.

In particular, the signal identification code in the temperature signal to be transmitted to the processing platform can be a stamp set for the signal in advance. For example, a signal identification code in a temperature signal to be transmitted to the processing platform by a first controller is set as a signal 001, and a signal identification code in a temperature signal to be transmitted to the processing platform by a second controller is set as a signal 010.

B-7: based on the obtained signal identification code of each the controller of the controllers which has been confirmed as no fault in the temperature signal, a first partitioning is performed on the temperature signal to be transmitted to the processing platform by each the controller of the controllers which has been confirmed as no fault in the temperature signal.

In step B-7, after obtaining the signal identification code of each the controller which has been confirmed as no fault in the temperature signal, each of the signal identification codes can be clustered, and the first partitioning is performed on the temperature signal to be transmitted to the processing platform by each the controller which has been confirmed as no fault in the temperature signal based on a clustering result. For example, in a case that controllers which have been confirmed as no fault in the temperature signals are a first controller, a second controller, a third controller, and a fourth controller, a signal identification code in a temperature signal to be transmitted to the processing platform by the first controller is set as a signal 001; a signal identification code in a temperature signal to be transmitted to the processing platform by the second controller is set as a signal 010; a signal identification code in a temperature signal to be transmitted to the processing platform by the third controller is set as a signal 001; and a signal identification code in a temperature signal to be transmitted to the processing platform by the fourth controller is set as a signal 010. The signal identification codes of these controllers are clustered, such that the signals 001 belong to a first cluster and the signals 010 belong to a second cluster. Based on such clustering result, the temperature signals to be transmitted to the processing platform by the first and third controllers are assigned to the first cluster, and the temperature signals to be transmitted to the processing platform by the second and fourth controllers are assigned to the second cluster.

B-8: capacity of the temperature signal to be transmitted to the processing platform by each the controller of the controllers which has been confirmed as no fault temperature signal is determined.

In particular, after determining the capacity of the temperature signal to be transmitted to the processing platform by each controller of the controllers which has been confirmed as no fault temperature signal, the capacity of each of the temperature signals is registered, and the temperature signal to be transmitted to the processing platform of each controller of the controllers which has been confirmed as no fault temperature signal can be serialized according to the capacity of the temperature signals, which will be advantageous to perform the subsequent step of clustering the temperature signals.

B-9: based on the determined capacity of the temperature signal to be transmitted to the processing platform by each controller of the controllers which has been confirmed as no fault temperature signal, temperature signal capacity of each of the clusters after the first partitioning is obtained.

In step B-9, the case is provided by that the controllers which have been confirmed as no fault temperature signal are still the first controller, the second controller, the third controller, and the fourth controller. The capacity of the temperature signals to be transmitted to the processing platform by the first controller, the second controller, the third controller, and the fourth controller in step A-5 can be defined as: the capacity of the temperature signal to be transmitted to the processing platform by the first controller is 16*1024 bit; the capacity of the temperature signal to be transmitted to the processing platform by the second controller is 8*1024 bit; the capacity of the temperature signal to be transmitted to the processing platform by the third controller is 24*1024 bit; and the capacity of the temperature signal to be transmitted to the processing platform by the fourth controller is 20*1024 bit. If these controllers belong to the cluster illustrated in step A-4 as the first cluster, the temperature signal capacity of such cluster is 40*1024 bit. The temperature signals to be transmitted to the processing platform by the second and fourth controllers are assigned to the second cluster, and the temperature signal capacity of such cluster is 28*1024 bit.

B-10: based on the temperature signal capacity of each of the clusters after the first partitioning and preset temperature signal transmission capacity, the clustering result after the first partitioning is reclustered.

In particular, preset transmission capacity of a set of temperature signals can be determined based on specific requirements, such as setting preset capacity of a set of temperature signals as 36*1024 bit. For example, there are a first controller, a second controller, a third controller, and a fourth controller. The temperature signals to be transmitted to the processing platform by the first and third controllers are assigned to a cluster having capacity of 40*1024 bit. The temperature signals to be transmitted to the processing platform by the second and fourth controllers are assigned to a cluster having capacity of 28*1024 bit. As such, the cluster receiving the temperature signals to be transmitted to the processing platform by the first and third controllers has the capacity of the temperature signals higher than 36*1024 bit. The temperature signals to be transmitted to the processing platform by the third and fourth controller can be varied. That is, the temperature signals of the different clusters can be varied. The temperature signal to be transmitted to the processing platform by the varied first controller and the temperature signal to be transmitted to the processing platform by the fourth controller can be assigned to a cluster which has temperature signal capacity of 36*1024 bit. The temperature signals to be transmitted to the processing platform by the third and fourth controllers can be assigned to a cluster which has temperature signal capacity of 32*1024 bit. Accordingly, the temperature signal capacity of these clusters is not higher than or over 36*1024 bit, which can meet the requirements, and thus the varying is terminated.

B-11: according to the clustering result of the reclustering, the temperature signal to be transmitted to the processing platform by each controller of the controllers which has been confirmed as no fault temperature signal is encapsulated to an information package in accordance with the temperature signals of the single cluster, and then all of the information packages are synchronously transmitted to the remote processing platform.

In step B-11, according to the clustering result, the temperature signal to be transmitted to the processing platform by each controller can be transmitted to the remote processing platform with only one time, thereby improving the speed and performance of the temperature signal transmission. Prior to synchronously transmitting all the information packages to the remote processing platform, the step of B-11 further includes testing whether the link between the intermediate router and the remote processing platform is unblocked. When the link is tested as unblocked, according to the clustering result of the temperature signal to be transmitted to the processing platform by each controller of the controllers which has been confirmed as no fault temperature signal, all of the information packages are synchronously transmitted to the remote processing platform. When the link is tested as failed and thus blocked, synchronously transmitting all of the information packages to the remote processing platform is terminated until the link is tested as unblocked, and then all of the information packages are just synchronously transmitted to the remote processing platform.

A third embodiment: the process implemented in the intermediate router includes steps executed in sequence as follows.

C-1: temperature signals to be transmitted to a processing platform which are transmitted by several controllers are obtained.

C-2: a message to confirm whether the temperature signal to be transmitted to the processing platform is correct is transmitted to each the controller.

In step C-2, the message to confirm whether the temperature signal to be transmitted to the processing platform is correct is transmitted to each the controller, in which the message has the corresponding temperature signal to be transmitted to the processing platform. For example, in a case with a first controller, a message to confirm whether a temperature signal to be transmitted to the processing platform is correct is transmitted to the first controller, in which the message has the temperature signal to be transmitted to the processing platform which is transmitted by the first controller.

C-3: if a message which is fed back from each the controller is received with confirming that the temperature signal to be transmitted to the processing platform is correct, a process of individually determining whether that there is any fault in the temperature signal to be transmitted to the processing platform by each the controller is performed.

In datil, after receiving the message which is fed back from each the controller with confirming that the temperature signal to be transmitted to the processing platform is correct, the process of individually determining whether that there is any fault in the temperature signal to be transmitted to the processing platform by each the controller is performed, so as to ensure that the subsequent process can go smoothly.

C-4: if a message which is fed back from each the controller to be confirmed is received with confirming that the temperature signal to be transmitted to the processing platform is incorrect, an instruction is transmitted to the controller to be confirmed for asking for obtaining the temperature signal. A new temperature signal to be transmitted to the processing platform which is transmitted by the controller to be confirmed is received, and then the process of individually determining whether that there is any fault in the temperature signal to be transmitted to the processing platform by each the controller is performed. The controller to be confirmed is anyone of the several controllers that transmit the temperature signals to be transmitted to the processing platform.

In step C-4, if the message which is fed back from each the controller to be confirmed is received with confirming that the temperature signal to be transmitted to the processing platform is incorrect, the new temperature signal to be transmitted to the processing platform which is transmitted by the controller to be confirmed is received. After receiving the temperature signal to be transmitted to the processing platform which is transmitted by the controller to be confirmed, a process of individually determining whether that there is any fault in the temperature signal to be transmitted to the processing platform by each the controller is performed.

In step C-4, after obtaining the temperature signals to be transmitted to the processing platform by the several controllers, the temperature signals to be transmitted to the processing platform are transmitted to the corresponding controller for confirmation. If something incorrect happen, the temperature signals to be transmitted to the processing platform are obtained again, so as to prevent the subsequent temperature signals from being incorrect.

C-5: a signal identification code is obtained from the temperature signal to be transmitted to the processing platform by each the controller of the controllers which has been confirmed as no fault in the temperature signal.

In particular, the signal identification code in the temperature signal to be transmitted to the processing platform may be a stamp set for a signal in advance. For example, a signal identification code in a temperature signal to be transmitted to the processing platform by a first controller is set as a signal 001, and a signal identification code in a temperature signal to be transmitted to the processing platform by a second controller is set as a signal 010.

C-6: based on the obtained signal identification code of each the controller of the controllers which has been confirmed as no fault in the temperature signal, a first partitioning is performed on the temperature signal to be transmitted to the processing platform by each the controller of the controllers which has been confirmed as no fault in the temperature signal.

In step C-6, after obtaining the signal identification code of each the controller which has been confirmed as no fault in the temperature signal, each of the signal identification codes can be clustered, and the first partitioning is performed on the temperature signal to be transmitted to the processing platform by each the controller which has been confirmed as no fault in the temperature signal based on a clustering result. For example, in a case that controllers which have been confirmed as no fault in the temperature signals are a first controller, a second controller, a third controller, and a fourth controller, a signal identification code in a temperature signal to be transmitted to the processing platform by the first controller is set as a signal 001; a signal identification code in a temperature signal to be transmitted to the processing platform by the second controller is set as a signal 010; a signal identification code in a temperature signal to be transmitted to the processing platform by the third controller is set as a signal 001; and a signal identification code in a temperature signal to be transmitted to the processing platform by the fourth controller is set as a signal 010. The signal identification codes of these controllers are clustered, such that the signals 001 belong to a first cluster and the signals 010 belong to a second cluster. Based on such clustering result, the temperature signals to be transmitted to the processing platform by the first and third controllers are assigned to the first cluster, and the temperature signals to be transmitted to the processing platform by the second and fourth controllers are assigned to the second cluster.

C-7: capacity of the temperature signal to be transmitted to the processing platform by each the controller of the controllers which has been confirmed as no fault temperature signal is determined.

In particular, after determining the capacity of the temperature signal to be transmitted to the processing platform by each controller of the controllers which has been confirmed as no fault temperature signal, the capacity of each of the temperature signals is registered, and the temperature signal to be transmitted to the processing platform of each controller of the controllers which has been confirmed as no fault temperature signal can be serialized according to the capacity of the temperature signals, which will be advantageous to perform the subsequent step of clustering the temperature signals.

C-8: based on the determined capacity of the temperature signal to be transmitted to the processing platform by each controller of the controllers which has been confirmed as no fault temperature signal, temperature signal capacity of each of the clusters after the first partitioning is obtained.

In step C-8, the case is provided by that the controllers which have been confirmed as no fault temperature signal are still the first controller, the second controller, the third controller, and the fourth controller. The capacity of the temperature signals to be transmitted to the processing platform by the first controller, the second controller, the third controller, and the fourth controller in step A-5 can be defined as: the capacity of the temperature signal to be transmitted to the processing platform by the first controller is 16*1024 bit; the capacity of the temperature signal to be transmitted to the processing platform by the second controller is 8*1024 bit; the capacity of the temperature signal to be transmitted to the processing platform by the third controller is 24*1024 bit; and the capacity of the temperature signal to be transmitted to the processing platform by the fourth controller is 20*1024 bit. If these controllers belong to the cluster illustrated in step A-4 as the first cluster, the temperature signal capacity of such cluster is 40*1024 bit. The temperature signals to be transmitted to the processing platform by the second and fourth controllers are assigned to the second cluster, and the temperature signal capacity of such cluster is 28*1024 bit.

C-9: based on the temperature signal capacity of each of the clusters after the first partitioning and preset temperature signal transmission capacity, the clustering result after the first partitioning is reclustered.

In particular, preset transmission capacity of a set of temperature signals can be determined based on specific requirements, such as setting preset capacity of a set of temperature signals as 36*1024 bit. For example, there are a first controller, a second controller, a third controller, and a fourth controller. The temperature signals to be transmitted to the processing platform by the first and third controllers are assigned to a cluster having capacity of 40*1024 bit. The temperature signals to be transmitted to the processing platform by the second and fourth controllers are assigned to a cluster having capacity of 28*1024 bit. As such, the cluster receiving the temperature signals to be transmitted to the processing platform by the first and third controllers has the capacity of the temperature signals higher than 36*1024 bit. The temperature signals to be transmitted to the processing platform by the third and fourth controller can be varied. That is, the temperature signals of the different clusters can be varied. The temperature signal to be transmitted to the processing platform by the varied first controller and the temperature signal to be transmitted to the processing platform by the fourth controller can be assigned to a cluster which has temperature signal capacity of 36*1024 bit. The temperature signals to be transmitted to the processing platform by the third and fourth controllers can be assigned to a cluster which has temperature signal capacity of 32*1024 bit. Accordingly, the temperature signal capacity of these clusters is not higher than or over 36*1024 bit, which can meet the requirements, and thus the varying is terminated.

C-10: according to the clustering result of the reclustering, the temperature signal to be transmitted to the processing platform by each controller of the controllers which has been confirmed as no fault temperature signal is encapsulated to an information package in accordance with the temperature signals of the single cluster, and then all of the information packages are synchronously transmitted to the remote processing platform.

In step C-10, according to the clustering result, the temperature signal to be transmitted to the processing platform by each controller can be transmitted to the remote processing platform with only one time, thereby improving the speed and performance of the temperature signal transmission. Prior to synchronously transmitting all the information packages to the remote processing platform, the step of B-11 further includes testing whether the link between the intermediate router and the remote processing platform is unblocked. When the link is tested as unblocked, according to the clustering result of the temperature signal to be transmitted to the processing platform by each controller of the controllers which has been confirmed as no fault temperature signal, all of the information packages are synchronously transmitted to the remote processing platform. When the link is tested as failed and thus blocked, synchronously transmitting all of the information packages to the remote processing platform is terminated until the link is tested as unblocked, and then all of the information packages are just synchronously transmitted to the remote processing platform.

It should be noted that the above embodiments are only used to explain the technical solution of the present invention, not the limitation. Although the present invention is described in detail with reference to the preferred embodiments, it should be understood by those skilled in the art that the technical solution of the present invention can be modified or replaced equally without departing from the spirit and scope of the technical solution of the present invention which should be covered in the right of the present invention.

What is claimed is:

1. A method for inspecting a traction power, comprising:
    coupling a temperature sensor of each inspection device to a corresponding controller, wherein a link between each the controller and a processing platform is established through an intermediate router, a temperature signal collected by each of the temperature sensors is transmitted to the corresponding controller, and each of the controllers transmits the temperature signal to the processing platform;
    wherein the transmitting the temperature signal to the processing platform by each the controller includes a process implemented in the intermediate router, and the process implemented in the intermediate router comprises:
    A-1: receiving the temperature signals transmitted by the several controllers through the intermediate router;
    A-2: individually determining whether there is any fault in the temperature signal of each the controller;
    A-3: obtaining a signal identification code from the temperature signal of the controller which has been confirmed as no fault in the temperature signal;
    A-4: performing a first partitioning to the temperature signal of the controller which has been confirmed as no fault in the temperature signal, based on the obtained signal identification code corresponding to the controller which has been confirmed as no fault in the temperature signal;
    A-5: determining capacity of the temperature signal of the controller which has been confirmed as no fault temperature signal;
    A-6: obtaining temperature signal capacity of each of clusters after the first partitioning, based on the determined capacity of the temperature signals of the controllers which have been confirmed as no fault temperature signal;
    A-7: reclustering a clustering result after the first partitioning, based on the temperature signal capacity of each of the clusters after the first partitioning and preset temperature signal transmission capacity; and
    A-8: according to the clustering result of the reclustering, encapsulating the temperature signal of the controller which has been confirmed as no fault temperature signal to an information package in accordance with the temperature signals of the single cluster, and then synchronously transmitting all of the information packages to the processing platform.

2. The method of claim 1, wherein prior to the transmitting the temperature signal to the intermediate router by each the controller, the method further comprises:
    testing whether a link from the intermediate router to each the controller is unblocked;
    wherein when the link is tested as unblocked, the temperature signal from the controller is received;
    wherein when the link is tested as failed and thus blocked, the receiving the temperature signal from the controller is terminated until the link is tested as unblocked, and then the receiving the temperature signal of the controller is executed.

3. The method of claim 1, wherein after the transmitting the temperature signal to the intermediate router by each the controller, the method further comprises:
    after the receiving the temperature signal to be transmitted to the processing platform which is transmitted by each the controller, the step of A-1 may further include:
    according to a preset temperature signal requirement, determining whether the temperature signal from the controller meets a signal transmission protocol;
    wherein if the temperature signal from each the controller is determined as meeting the signal transmission protocol, a next step is executed;
    wherein if the temperature signal from each the controller is determined as not meeting the signal transmission protocol, an instruction of retransmitting the temperature signal is transmitted to the controller that is determined as not meeting the signal transmission protocol, and the temperature signal retransmitted by the controller that is determined as not meeting the signal transmission protocol is received.

4. The method of claim 3, wherein the signal transmission protocol is preset as signal format of a transmission temperature signal protocoled between the controller and the intermediate router.

5. The method of claim 1, the signal identification code in the temperature signal is a stamp preset for a signal.

6. The method of claim 1, wherein the performing the first partitioning comprises:
    after the obtaining the signal identification code of the controller which has been confirmed as no fault in the temperature signal, clustering each of the signal identification codes, and performing the first partitioning on the temperature signal of the controller which has been confirmed as no fault in the temperature signal based on the clustering result.

7. The method of claim 1, wherein after the determining the capacity of the temperature of the controller which has been confirmed as no fault temperature signal, the capacity of each of the temperature signals is registered, and each of the temperature signals of the controller which has been confirmed as no fault temperature signal is serialized according to the capacity of the temperature signals.

8. The method of claim 1, wherein prior to the synchronously transmitting all of the information packages to the processing platform, the method further comprises testing whether a link between the intermediate router and the remote processing platform is unblocked;
  wherein when the link is tested as unblocked, according to the clustering result of the reclustering, all of the information packages are synchronously transmitted to remote processing platform;
  wherein when the link is tested as failed and thus blocked, the synchronously transmitting all of the information packages to the processing platform is terminated until the link is tested as unblocked, and then all of the information packages are just synchronously transmitted to the processing platform.

9. The method of claim 7, wherein the process implemented in the intermediate router further comprises:
  A-9: receiving a feedback message from the temperature signal transmission fed back by the processing platform;
  A-10: transmitting a response message of the successful temperature signal transmission to the controller which has been confirmed as no fault temperature signal, if the feedback message from the temperature signal transmission is that the temperature signal transmission is successful; and
  A-11: executing the clustering result of the reclustering according to a preset period, such that the temperature signal of the controller has been confirmed as no fault temperature signal is transmitted to the processing platform, if the feedback message of the temperature signal transmission is that the temperature signal transmission fails.

10. The method of claim 1, wherein the individually determining whether there is no fault in the temperature signal of each the controller is replaced as a step of determining individually whether there is any preset reserved word in the temperature signal of each the controller and further determined individually whether format of the temperature signal of each the controller meets a requirement of preset format.

11. The method of claim 10, wherein the preset reserved word in the temperature signal updated by each the controller includes a recognition code and a stamp of the temperature signal;
  wherein the requirement of the preset format includes the transmitted temperature signal having a domain for storing the stamp of the temperature signal and another domain for storing identification.

12. The method of claim 1, wherein the process implemented in the intermediate router is replaced as following steps:
  B-1: receiving verification instructions transmitted by the several controllers, wherein the verification instructions contain identification codes of the corresponding controllers;
  B-2: searching to check whether any existence of the identification code of the verification instructions transmitted by the several controllers is in pre-stored identification codes in the controllers;
  B-3: receiving the temperature signals transmitted by the several controllers, if any existence of the identification code of the controller to be accessed is searched from the pre-stored identification codes of the controllers;
  B-4: forbidding accessing of the controller to be accessed, and transmitting a message of unsuccessful verification to the controller to be accessed, if existence of the identification code of the controller to be accessed is not searched from the pre-stored identification codes of the controllers;
  B-5: determining individually whether there is any fault in the temperature signal of each the controller;
  B-6: obtaining a signal identification code is obtained from the temperature signal of the controller which has been confirmed as no fault in the temperature signal;
  B-7: performing a first partitioning on the temperature of the controller which has been confirmed as no fault in the temperature signal, based on the obtained signal identification code corresponding to the controller which has been confirmed as no fault in the temperature signal;
  B-8: determining capacity of the temperature signal of the controller which has been confirmed as no fault temperature signal;
  B-9: obtaining temperature signal capacity of each of clusters after the first partitioning, based on the determined capacity of the temperature signal of the controller which has been confirmed as no fault temperature signal;
  B-10: reclustering a clustering result after the first partitioning, based on the temperature signal capacity of each of the clusters after the first partitioning and preset temperature signal transmission capacity; and
  B-11: according to the clustering result of the reclustering, encapsulating the temperature signal of the controller which has been confirmed as no fault temperature signal to an information package in accordance with the temperature signals of the single cluster, and then synchronously transmitting all of the information packages to the processing platform.

13. The method of claim 1, wherein the process implemented in the intermediate router is replaced as following steps:
  C-1: receiving the temperature signals transmitted by the several controllers by the intermediate router;
  C-2: transmitting a message to each the controller, so as to confirm whether the temperature signal to be transmitted to the processing platform is correct;
  C-3: individually determining whether that there is any fault in the temperature signal of each the controller, if a message which is fed back from each the controller is received with confirming that the temperature signal is correct;
  C-4: transmitting an instruction to the controller for asking for obtaining the temperature signal, receiving a new temperature signal is transmitted by the controller, and determining individually whether that there is any fault in the temperature signal of the controller, if a message which is fed back from the controller is received with confirming that the temperature signal is incorrect;

C-5: obtaining a signal identification code is obtained from the temperature signal of the controller which has been confirmed as no fault in the temperature signal;

C-6: performing a first partitioning on the temperature of the controller which has been confirmed as no fault in the temperature signal, based on the obtained signal identification code corresponding to the controller which has been confirmed as no fault in the temperature signal;

C-7: determining capacity of the temperature signal of the controller which has been confirmed as no fault temperature signal;

C-8: obtaining temperature signal capacity of each of clusters after the first partitioning, based on the determined capacity of the temperature signal of the controller which has been confirmed as no fault temperature signal;

C-9: reclustering a clustering result after the first partitioning, based on the temperature signal capacity of each of the clusters after the first partitioning and preset temperature signal transmission capacity; and C-10: according to the clustering result of the reclustering, encapsulating the temperature signal of the controller which has been confirmed as no fault temperature signal to an information package in accordance with the temperature signals of the single cluster, and then synchronously transmitting all of the information packages to the processing platform.

\* \* \* \* \*